July 26, 1932.  A. EDSON  1,869,240
TOOL HOLDING DEVICE
Filed March 12, 1930  2 Sheets-Sheet 1
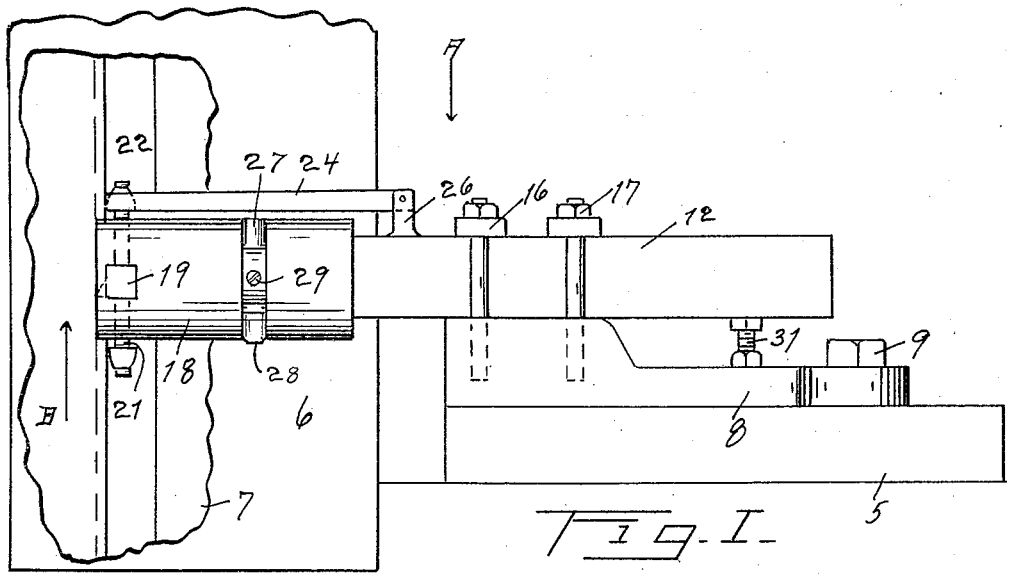
Fig. I.
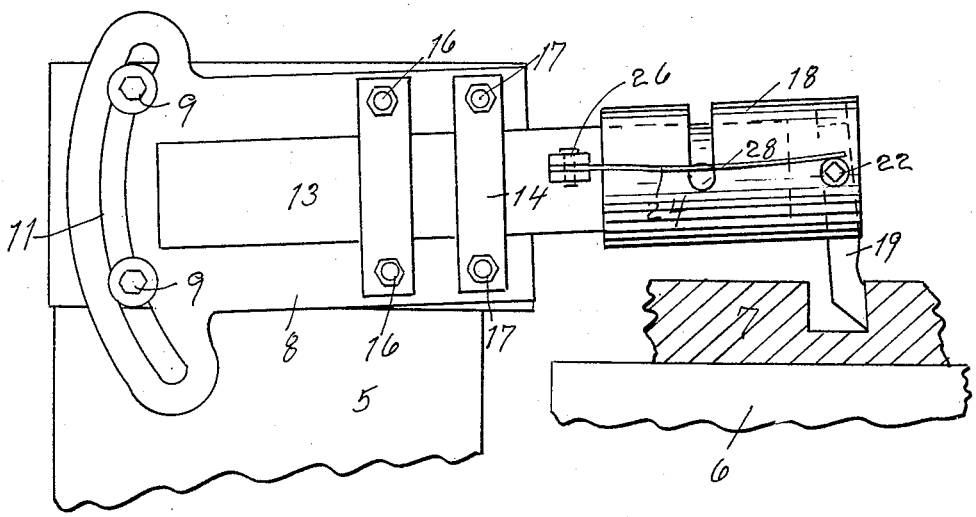
Fig. II.
INVENTOR.
A. EDSON
BY *Victor J Evans*
ATTORNEY July 26, 1932.  A. EDSON  1,869,240
TOOL HOLDING DEVICE
Filed March 12, 1930   2 Sheets-Sheet 2
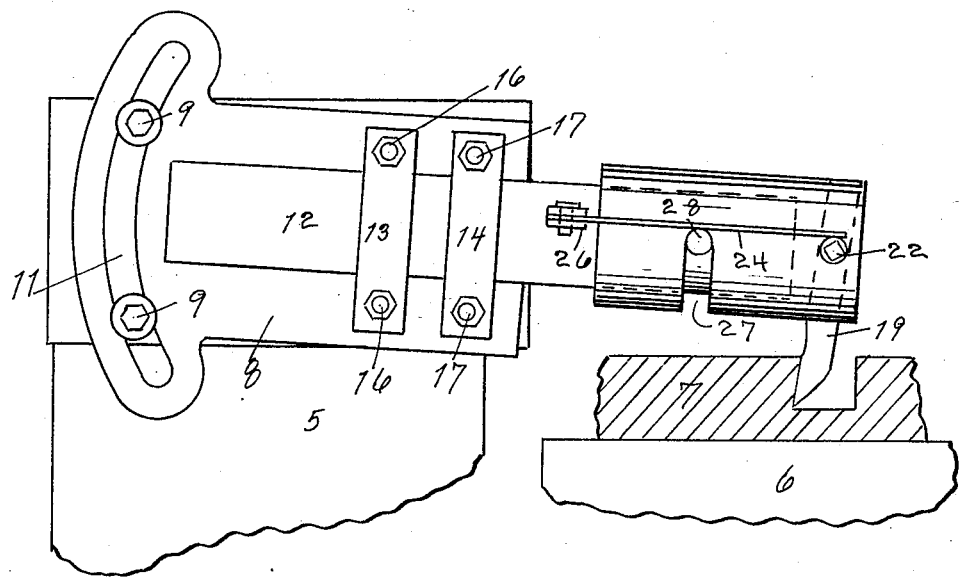
_Fig. III._
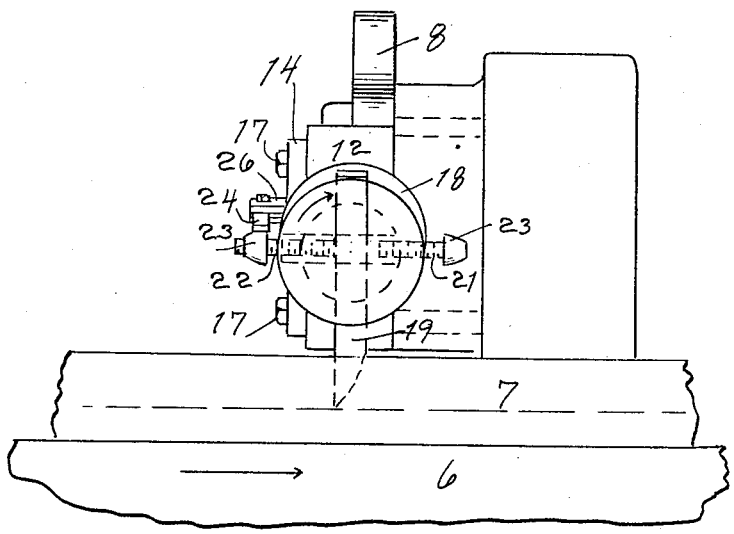
_Fig. IV._
INVENTOR.
A. EDSON
BY *Victor J Evans*
ATTORNEY.

Patented July 26, 1932

1,869,240

UNITED STATES PATENT OFFICE

ARTHUR EDSON, OF ELK, CALIFORNIA

TOOL HOLDING DEVICE

Application filed March 12, 1930. Serial No. 435,254.

This invention relates to improvements in tool holding devices and has particular reference to a holder for planer tools.

The principal object of this invention is to provide a tool holder wherein it is desired to make undercuts.

Another object of the present invention is to produce a device which is exceedingly simple.

A further object is to produce a device which may be quickly adjusted and one which is economical to manufacture.

Other objects and advantages will be apparent during the course of the following description.

In the accompanying drawings forming a part of this specification, and in which like numerals are employed to designate like parts throughout the same, Figure I is a top plan view of my tool holder as the same would appear when in use, Figure II is a side elevation of Figure I looking in the direction of the arrow A and showing an undercut on one side of a groove, Figure III is a view similar to Figure II showing the tool moved so that the undercut is upon the opposite side of the groove, and Figure IV is an end elevation of Figure III.

In undercutting on an ordinary planer, it is difficult to adjust the tool so that an accurate cut will be taken, and further the tool in returning for successive cuts often will not relieve itself and therefore drags over the work causing a poor job and it is often very hard to adjust and keep adjusted.

I have therefore devised a head wherein the tool may be accurately adjusted and one which will relieve itself.

In the accompanying drawings wherein for the purpose of illustration is shown a preferred embodiment of my invention, the numeral 5 designates the head of the planer and the numeral 6 the bed upon which the work 7 is secured. To the head 5 is secured a tilting block 8 which is held thereto by bolts 9 which pass through a slot 11 formed in the block 8.

A tool holder arm 12 is slidably held on the block 8 by straps 13 and 14 which in turn are held to the block 8 by bolts 16 and 17, respectively. The outer end of the tool holder arm is turned so as to rotatably hold the tool holder 18 within which the tool 19 may be adjustably held by either the set screw 21 or the set screw 22, each of which set screws carries a cone cap 23 adapted to be engaged by the end of a spring 24 held by a bracket 26 carried upon the tool holding arm 12.

The tool holder 18 has a slot 27 formed half-way there-through with the result that a sliding pin 28 may act as a stop for the holder to permit the same to be turned but a half revolution.

This sliding pin 28 is equal to the length of the round portion of the tool holder arm, plus the thickness of the tool holder and is held in adjustable position by a set screw 29 (see Figure I).

The result of this construction is that when it is desired to make an undercut, for instance, the undercut as shown in Figure II, the tilting block 8 is adjusted through the medium of the bolts 9 to the angle of the undercut. The tool holder arm is then adjusted under the straps 13 and 14 and the tool holder turned to the position of this figure. The pin 28 is now moved so that it is in the position shown in Figure I, and the spring 24 brought to bear against the cone-head of the set screw 22. By now causing the bed 6 to be actuated in the direction of the arrow A, the result will be that during the movement in this direction, the face of the tool will engage the work 7 and cause a cut to be taken therefrom. The tool holder cannot turn upon the tool arm for the reason that the holder abuts the pin 28. When the end of the cut has been made and the bed moves in a reverse direction, the spring 24 will permit the tool holder to rotate upon the tool holder arm and to thus relieve itself upon the back stroke.

When it is desired to make a cut upon the opposite side of the work as illustrated in Figure III, the tilting block 8 is readjusted and the tool holder is given a half revolution upon the tool holding arm and the pin 28 is moved to the opposite side of the arm.

From this point on the operation is exactly the same in that the tool holder will rock upon the tool holding arm upon the back stroke but will be held rigid on the arm during the forward stroke.

It will thus be seen that I have provided a very simple device which will accomplish all the objects herein set forth.

In order to prevent the tool from springing, an expansion member 31 is positioned between the end of the tool holder arm and the block 8.

It is to be understood that the form of my invention herewith shown and described is to be taken as a preferred example of the same, and that various changes relative to the shape, size, material and arrangement of parts may be resorted to without departing from the spirit of the invention or the scope of the subjoined claims.

Having thus described my invention, I claim:—

1. A tool holder for planing machines comprising a tool holding arm adjustably mounted on the planer, a tubular tool holder rotatably secured on the end of said arm, means for supporting a tool in said holder, said means comprising a pair of oppositely disposed set screws, a cone positioned on each of said set screws, a circumferential slot formed in said tool holder, a pin held in said arm and having one end extending into said slot, said pin being slidable to either side of said arm to cooperate with the end of said slot when said tool holder is rotated in either direction, and a spring carried by said arm for causing the end of said slot in said tool holder to engage said pin.

2. In a tool holding device of the character described, a block adjustably secured to a planing machine, an arm slidably secured to said block said arm having a reduced end of circular cross-section, a tool holder freely rotatably mounted on said reduced end of said arm, said tool holder having a circumferential slot formed therein a pin carried by said arm and extending into said slot to cooperate with the end of said slot in either position of the tool holder, a spring secured to said arm and engaging a projection carried on said tool holder for resisting the rotation of said tool holder in the opposite direction of that of said pin.

In testimony whereof I affix my signature.

ARTHUR EDSON.